US012795750B2

(12) United States Patent
Abhigyan et al.

(10) Patent No.: US 12,795,750 B2
(45) Date of Patent: Nov. 10, 2026

(54) TRANSPORT LAYER APPROACH TO SECURE MOBILE TERMINATION

(71) Applicant: AT&TIntellectual Property I, L.P., Atlanta, GA (US)

(72) Inventors: Abhigyan, Basking Ridge, NJ (US); Aleksandr Zelezniak, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1077 days.

(21) Appl. No.: 17/646,232

(22) Filed: Dec. 28, 2021

(65) Prior Publication Data

US 2023/0209615 A1 Jun. 29, 2023

(51) Int. Cl.
*H04W 76/10* (2018.01)
*H04L 61/4505* (2022.01)
(Continued)

(52) U.S. Cl.
CPC ......... *H04W 76/10* (2018.02); *H04L 61/5007* (2022.05); *H04W 8/20* (2013.01); *H04W 12/08* (2013.01); *H04L 61/4505* (2022.05)

(58) Field of Classification Search
CPC ... H04W 12/08; H04W 12/069; H04W 12/71; H04W 28/12; H04W 60/00; H04W 8/205;
(Continued)

(56) References Cited

U.S. PATENT DOCUMENTS 8,009,572 B2 * 8/2011 Heinla .................. H04M 15/47 370/252
8,374,188 B2 * 2/2013 Yahyaoui ............ H04L 61/2575 709/227
(Continued)

FOREIGN PATENT DOCUMENTS

EP 3192224 B1 * 3/2020 ............. G06F 21/33
WO WO-2018138656 A1 * 8/2018 ......... H04L 12/2898

OTHER PUBLICATIONS

Abhigyan et al., "Enhancing Network Services Based on Edge Clouds," U.S. Appl. No. 17/099,313, filed Nov. 16, 2020.

*Primary Examiner* — Matthew C Sams
(74) *Attorney, Agent, or Firm* — Guntin & Gust, PLC; Andrew Gust

(57) ABSTRACT

A method performed by a processing system includes receiving a request from a first user endpoint device to establish a mobile terminating connection to a second user endpoint device, determining whether an access certificate that is associated with the second user endpoint device has been received from the first user endpoint device, terminating the mobile terminating connection at the processing system when the access certificate is determined to be received from the first user endpoint device, identifying a private Internet Protocol address that is associated with the second user endpoint device when the access certificate is determined to be received from the first user endpoint device, and establishing a connection from the processing system to the second user endpoint device, separate from the
(Continued)

100 mobile terminating connection from the first user endpoint device to the processing system, using the private internet protocol address of the second user endpoint device.

20 Claims, 4 Drawing Sheets

(51) Int. Cl.
*H04L 61/5007* (2022.01)
*H04W 8/20* (2009.01)
*H04W 12/08* (2021.01)

(58) Field of Classification Search
CPC ....... H04W 88/04; H04W 76/10; H04W 8/20; H04W 84/042; H04L 12/2898; H04L 45/22; H04L 61/2514; H04L 61/3025; H04L 61/4511; H04L 63/0272; H04L 63/0823; H04L 61/4505; H04L 61/5007; H04L 63/0281; H04L 63/08; H04L 63/166; H04L 65/1045; H04L 65/1069; H04L 65/1095; H04L 67/02; H04L 9/0863; H04L 9/3242; H04L 9/3249; H04L 9/3268; H04M 3/00
See application file for complete search history.

(56) References Cited

U.S. PATENT DOCUMENTS

| | | | | |
|---|---|---|---|---|
| 8,752,161 | B1 * | 6/2014 | Thai | H04L 65/1045 370/395.2 |
| 10,148,443 | B2 * | 12/2018 | Venezia | H04L 63/0884 |
| 10,554,418 | B2 * | 2/2020 | Kshirsagar | H04L 9/3268 |
| 10,637,831 | B2 * | 4/2020 | Cottrell | H04L 63/0281 |
| 10,742,447 | B2 | 8/2020 | Ritchie | |
| 10,791,464 | B2 * | 9/2020 | Soliman | H04L 63/0876 |
| 10,798,560 | B2 * | 10/2020 | Chennupati | H04L 12/2898 |
| 10,958,662 | B1 * | 3/2021 | Sole | H04L 63/0853 |
| 2007/0019545 | A1 * | 1/2007 | Alt | H04L 63/0428 370/230 |
| 2008/0159299 | A1 * | 7/2008 | Bu | H04L 63/0823 370/400 |
| 2011/0131406 | A1 * | 6/2011 | Jones | H04W 12/0431 713/150 |
| 2015/0215775 | A1 * | 7/2015 | Burch | H04W 12/50 713/150 |
| 2016/0088092 | A1 | 3/2016 | Cardona-Gonzalez et al. | |
| 2016/0337175 | A1 | 11/2016 | Rao | |
| 2017/0223054 | A1 * | 8/2017 | Wing | H04L 63/0281 |
| 2017/0373860 | A1 * | 12/2017 | Kshirsagar | H04L 67/02 |
| 2019/0074982 | A1 * | 3/2019 | Hughes | H04L 9/0863 |
| 2019/0356599 | A1 | 11/2019 | Brissette et al. | |
| 2020/0019693 | A1 * | 1/2020 | Zhao | G06F 21/43 |
| 2021/0120416 | A1 * | 4/2021 | S Bykampadi | H04L 63/0281 |
| 2021/0392111 | A1 * | 12/2021 | Sole | H04L 63/1416 |
| 2023/0209615 | A1 * | 6/2023 | Abhigyan | H04W 12/08 455/450 |

* cited by examiner

TRANSPORT LAYER APPROACH TO SECURE MOBILE TERMINATION

The present disclosure relates generally to mobile communications and relates more particularly to methods, computer-readable media, and apparatuses for providing secure mobile terminating connections via a transport layer approach.

BACKGROUND

Communications involving at least one mobile device (e.g., a mobile phone, a tablet computer, an Internet of Things (loT) device, or the like) may fall into one of two categories: mobile originating (MO) and mobile terminating (MT). In MO communications, a mobile device is the caller or point of origin of a communication. In MT communications, a mobile device is the callee or point of termination of a communication.

SUMMARY

In one example, the present disclosure describes a method, computer-readable medium, and apparatus for providing secure mobile terminating connections via a transport layer approach. For instance, a method performed by a processing system includes receiving a request from a first user endpoint device to establish a mobile terminating connection to a second user endpoint device, determining whether an access certificate that is associated with the second user endpoint device has been received from the first user endpoint device, terminating the mobile terminating connection at the processing system when the access certificate that is associated with the second user endpoint device is determined to be received from the first user endpoint device, identifying a private Internet Protocol address that is associated with the second user endpoint device when the access certificate that is associated with the second user endpoint device is determined to be received from the first user endpoint device, and establishing a connection from the processing system to the second user endpoint device, separate from the mobile terminating connection from the first user endpoint device to the processing system, using the private internet protocol address of the second user endpoint device.

In another example, a non-transitory computer-readable medium stores instructions which, when executed by a processing system including at least one processor, cause the processing system to perform operations. The operations include receiving a request from a first user endpoint device to establish a mobile terminating connection to a second user endpoint device, determining whether an access certificate that is associated with the second user endpoint device has been received from the first user endpoint device, terminating the mobile terminating connection at the processing system when the access certificate that is associated with the second user endpoint device is determined to be received from the first user endpoint device, identifying a private Internet Protocol address that is associated with the second user endpoint device when the access certificate that is associated with the second user endpoint device is determined to be received from the first user endpoint device, and establishing a connection from the processing system to the second user endpoint device, separate from the mobile terminating connection from the first user endpoint device to the processing system, using the private internet protocol address of the second user endpoint device.

In another example, an apparatus includes a processing system including at least one processor and a computer-readable medium storing instructions which, when executed by the processing system, cause the processing system to perform operations. The operations include receiving a request from a first user endpoint device to establish a mobile terminating connection to a second user endpoint device, determining whether an access certificate that is associated with the second user endpoint device has been received from the first user endpoint device, terminating the mobile terminating connection at the processing system when the access certificate that is associated with the second user endpoint device is determined to be received from the first user endpoint device, identifying a private Internet Protocol address that is associated with the second user endpoint device when the access certificate that is associated with the second user endpoint device is determined to be received from the first user endpoint device, and establishing a connection from the processing system to the second user endpoint device, separate from the mobile terminating connection from the first user endpoint device to the processing system, using the private internet protocol address of the second user endpoint device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
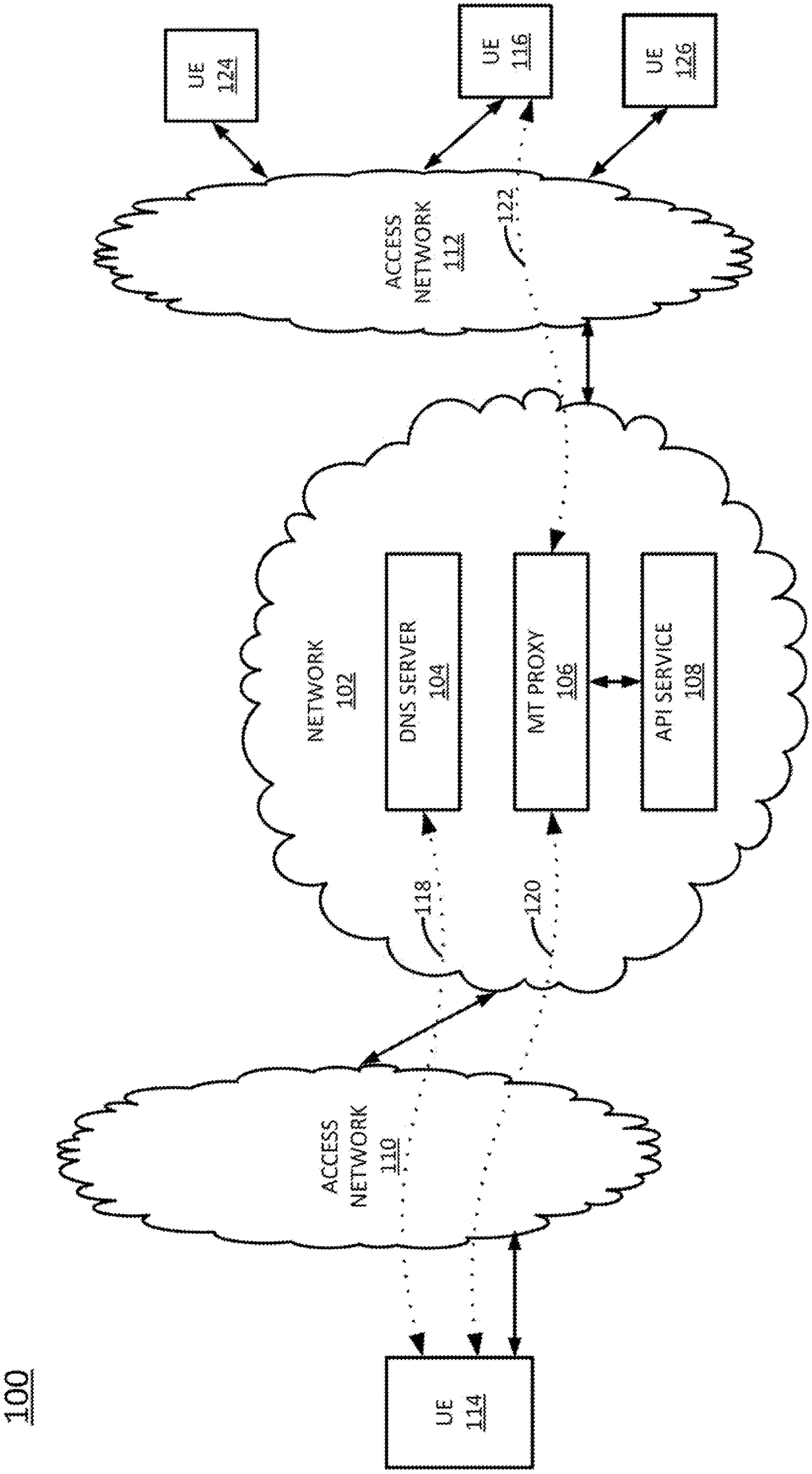
FIG. 1 illustrates an example system related to the present disclosure.

The present disclosure broadly discloses methods, computer-readable media, and apparatuses for providing secure mobile terminating connections via a transport layer approach. As discussed above, communications involving at least one mobile device (e.g., a mobile phone, a tablet computer, an Internet of Things (loT) device, or the like) may fall into one of two categories: mobile originating (MO) and mobile terminating (MT). In MO communications, a mobile a mobile device is the caller or point or origin of a communication. In MT communications, a mobile device is the callee or point of termination of a communication. Currently, MT connections are typically supported at the network layer by assigning static public Internet Protocol version 4 (IPv4) addresses to each mobile user, and then restricting access to those IP addresses using access control lists (ACLs) which are installed in the mobile packet core. The ACLs allow MT connections only from external clients whose IP addresses are authorized.

Although the use of static IPv4 addresses and ACLs allows for secure MT connections, this approach also has several limitations. For instance, the operational overhead required to update ACLs when the set of authorized external clients (or their IP addresses) change can be quite large. Moreover, because each mobile device is assigned a unique IPv4 address, the consumption of network resources (e.g., IP addresses) is also high.

Additionally, the use of static IPv4 addresses and ACLs may not guarantee secure connections. For instance, if the ACLs are not promptly updated when necessary, inaccurate or out of date ACL definitions may allow unauthorized MT connections, which can potentially lead to hacking of mobile devices and waste of radio network resources. Moreover, older, less secure transport protocols may be allowed, which potentially puts mobile devices at risk.

Examples of the present disclosure provide a transport layer (as opposed to network layer) approach for secure mobile terminating connections. In one example, a transport layer proxy is deployed in the mobile packet core to facilitate mobile terminating connections. Each mobile device is then identified using a persistent domain name (instead of a public IPv4 address), and domain name system (DNS) queries for these persistent domain names redirect external clients to the proxy. The proxy may mandate the use of secure transport protocols (e.g., transport layer security (TLS) protocol, the QUIC protocol, datagram transport layer security (DTLS) protocol, and the like) from external clients and blocks unencrypted or insecure (e.g., old TLS version) connections. During a transport layer "handshake," the proxy may check access certificates to restrict access to external clients who can present the access certificates needed to access the mobile devices. The proxy may also use server name identification (SNI) during the transport layer handshake to identify the mobile device the external client is trying to access. Finally, the proxy may use mobile packet core application programming interfaces (APIs) to map a mobile device's persistent host name portion of a domain name or SNI to the corresponding current private IP address and may set up a mobile terminating connection to the mobile device. These and other aspects of the present disclosure are described in greater detail below in connection with the discussion of FIGS. 1-4.

To better understand the present disclosure, FIG. 1 illustrates a block diagram depicting one example of a communication network or system 100 for performing or enabling the steps, functions, operations, and/or features described herein. The system 100 may include any number of interconnected networks which may use the same or different communication technologies. As illustrated in FIG. 1, system 100 may include a network 102, e.g., a core telecommunication network.

In one example, the network 102 may include a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 102 may alternatively or additionally include components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 102 uses a network function virtualization infrastructure (NFVI), e.g., servers in a data center or data centers that are available as host devices to host virtual machines (VMs) including virtual network functions (VNFs). In other words, at least a portion of the network 102 may incorporate software-defined network (SDN) components. In this regard, it should be noted that, as referred to herein, "traffic" may include all or a portion of a transmission, e.g., a sequence or flow, including one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks.

In one example, the network 102 may be in communication with networks 110 and networks 112. Networks 110 and 112 may each include a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 110 and 112 may include different types of networks. In another example, the networks 110 and 112 may be the same type of network. The networks 110 and 112 may be controlled or operated by a same entity as that of network 102 or may be controlled or operated by one or more different entities. In one example, the networks 110 and 112 may include separate domains, e.g., separate routing domains from the network 102. In one example, networks 110 and/or networks 112 may represent the Internet in general.

In one example, network 102 may transport traffic to and from user endpoint (UE) devices, including UE devices 114, 116, 124, and 126. For instance, the traffic may relate to communications such as voice telephone calls, video and other multimedia, text messaging, emails, and so forth among the UE devices, or between the UE devices and other devices that may be accessible via networks 110 and 112. For instance, the traffic may relate to management actions performed on the network 102 (e.g., management actions such as create/update/delete (CRUD) operations, queries, and so forth). The UE devices may include, for example, cellular telephones, smart phones, personal computers, other wireless and wired computing devices, private branch exchanges, customer edge (CE) routers, media terminal adapters, cable boxes, home gateways and/or routers, and so forth.

In one example, UE devices including UE devices 114, 116, 124, and 126 may communicate with or may communicate via network 102 in various ways. For example, user device 116 may include a cellular telephone which may connect to network 102 via network 112, e.g., a cellular access network. For instance, such an example network 112 may include one or more cell sites, e.g., including a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In such an example, the network 102 may include components such as a serving gateway (SGW), a mobility management entity (MME), or the like (not shown).

In one example, the network 102 may include a DNS server 104, a mobile terminating (MT) proxy 106, and an application programming interface (API) service 108. Collectively, the DNS server 104, MT proxy 106, and API service 108 may provide a transport layer solution for providing secure mobile terminating connections. The MT proxy 106 may be communicative coupled to both the DNS server 104 and the API service 108.

In one example, the DNS server 104 may store a lookup table that helps to identify mobile user endpoint devices that subscribe to services of a mobile telecommunications network service provider (e.g., mobile phone services). For instance, the lookup table may map domain names assigned to the mobile user endpoint devices to corresponding public IP addresses (e.g., IPv4 addresses, IPv6 addresses, or the like).

The MT proxy 106 may comprise an application server that is configured to establish a secure mobile terminating connection between a user endpoint device which is not a subscriber to services of a mobile telecommunications network service provider and a mobile device which is a subscriber to the services of the mobile telecommunications network service provider. For instance, the MT proxy 106 may be configured in a manner similar to the computing system 400 of FIG. 4, described in further detail below. The MT proxy 106 may be configured to verify access certificates provided by user endpoint devices that are requesting mobile terminating connections and to serve as a proxy termination point for the mobile terminating connection when the access certificates are verified.

The API service 108 may comprise a database or a storage server that stores a mapping of SNIs associated with user endpoint devices to private IP addresses assigned to the user endpoint devices.

In one example of operation, the UE device 114 may be a user endpoint device that does not subscribe to services of a mobile telecommunications service provider. However, the UE device 114 may request a mobile terminating connection to the UE device 116, which does subscribe to services of the mobile telecommunications service provider. In one example, the UE device 114 may initiate the mobile terminating connection by requesting, from the DNS server 104, a public IP address corresponding to a domain name associated with the UE device 116 (as indicated by the dotted line 118).

The DNS server 104 may store a "wild card" record that maps the domain names for a plurality of devices (e.g., including UE devices 116, 124, and 126) to a single public IP address (e.g., an IPv4 address, an IPv6 address, or the like) of the MT proxy 106. Thus, in response to the request from the UE device 114, the DNS server 104 may return to the UE device 114 a public IP address that routes to the MT proxy 106.

The UE device 114 may use the public IP address provided by the DNS server 104 to establish a connection to the MT proxy 106. The MT proxy 106 may then check an access certificate provided by the UE device 114 in order to verify that the UE device 114 is authorized to establish a mobile terminating connection to the UE device 116. For instance, the access certificate may comprise a credential that is issued by the mobile telecommunications service provider to the UE device 116 and then selectively shared by the UE device 116 with other UE devices which the UE device 116 authorizes to establish mobile terminating connections. Thus, the ability of the UE device 114 to provide the access certificate for the UE device 116 may serve as evidence that the UE device 114 is authorized to establish a mobile terminating connection to the UE device 116. Assuming that UE device 114 can provide the access certificate for the UE device 116, the MT proxy 106 may establish a mobile terminating connection from the UE device 114 to the MT proxy 106 (as indicated by the dotted line 120).

The MT proxy 106 may then determine a private IP address that corresponds to the SNI of the UE device 116. In secure protocols such as TLS, DTLS, and QUIC, the SNI is a variable that corresponds to the host part of a domain name. In one example, the MT proxy may query the API service 108 for the private IP address that corresponds to the SNI of the UE device 116. However, in another example, the MT proxy 106 may store a mapping of private IP addresses to SNIs locally.

Once the MT proxy 106 has determined the private IP address of the UE device 116, the MT proxy 106 may establish a connection from the MT proxy 106 to the UE device 116 (as indicated by the dotted line 122). Communications between the UE device 114 and the UE device 116 may then proceed with the MT proxy 106 serving as an intermediary for forwarding packets.

It should be noted that the system 100 has been simplified. In other words, the system 100 may be implemented in a different form than that illustrated in FIG. 1. For example, the system 100 may be expanded to include additional networks (e.g., a content distribution network (CDN), a network operations center (NOC) network, and the like), additional network devices (e.g., border devices, routers, switches, policy servers, security devices, gateways, and the like), additional service provider devices, additional customer devices, and so forth, without altering the scope of the present disclosure. In addition, system 100 may be altered to omit various elements, substitute elements for devices that perform the same or similar functions and/or combine elements that are illustrated as separate devices. For example, DNS server 104, MT proxy 106, API service 108, and/or other network devices may include functions that are integrated into a single device, and so forth. Thus, these and other modifications of the system 100 are all contemplated within the scope of the present disclosure.

Figure 2:
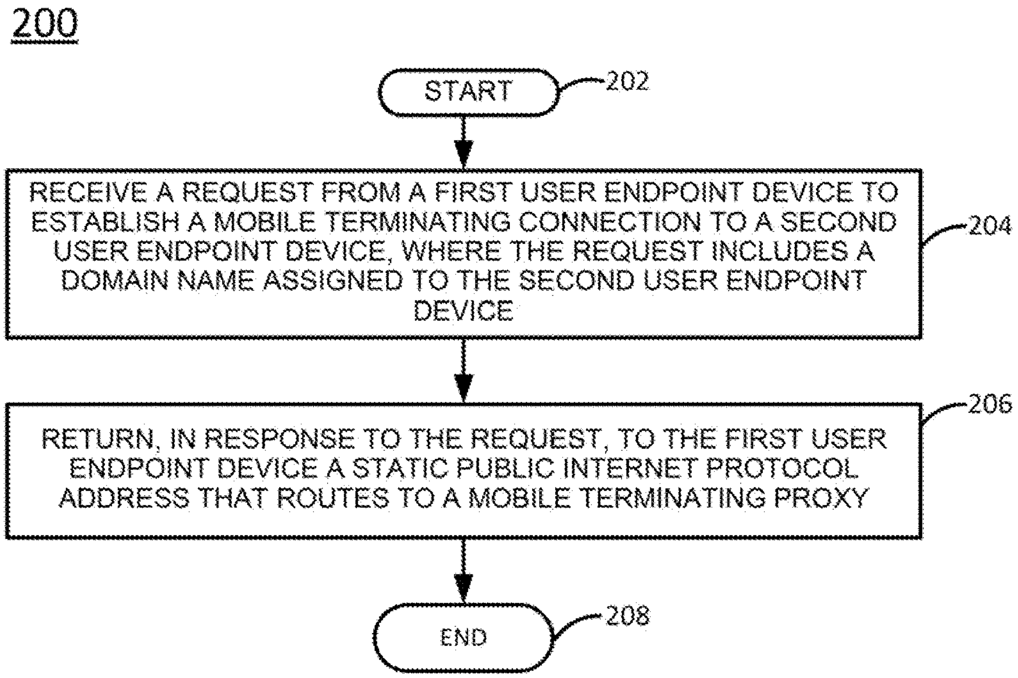
FIG. 2 illustrates a flowchart of an example method for providing secure mobile terminating connections via a transport approach, according to the present disclosure.

It is noted that various aspects of the present disclosure as discussed in FIG. 1 are described in greater detail below in connection with the discussion of FIGS. 2-4. To better understand the present disclosure, FIG. 2 illustrates a flowchart of an example method 200 for providing secure mobile terminating connections via a transport layer approach, according to the present disclosure. In one example, the steps, operations, or functions of the method 200 may be performed by any one or more of the components of the system 100 depicted in FIG. 1. For example, in one embodiment, the method 200 is performed by a DNS server (e.g., DNS server 104 of FIG. 1). In another example, the method 200 is performed by a DNS server in coordination with one or more other components of the system 100, such as mobile terminating proxy and/or an API service. In one example, the steps, functions, or operations of method 200 may be performed by a computing device or processing system, such as computing system 400 and/or a hardware processor element 402 as described in connection with FIG. 4 below. For instance, the computing system 400 may represent at least a portion of a DNS server in accordance with the present disclosure. In one example, the steps, functions, or operations of method 200 may be performed by a processing system comprising a plurality of such computing devices as represented by the computing system 400. For illustrative purposes, the method 200 is described in greater detail below in connection with an example performed by a processing system.

The method 200 begins in step 202 and proceeds to step 204. In step 204, the processing system may receive a request from a first user endpoint device to establish a mobile terminating connection to a second user endpoint device, where the request includes a domain name assigned to the second user endpoint device. In one example, the processing system may be part of a mobile packet core network provided by a mobile telecommunications service provider, and the second user endpoint device may comprise a mobile user endpoint device that subscribes to mobility services provided by mobile telecommunications service provider. The first user endpoint device may comprise a user endpoint device that does not subscribe to mobility services provided by mobile telecommunications service provider (e.g., an external client). For instance, the first user endpoint device may comprise a mobile or non-mobile user endpoint device that subscribes to services provided by a different telecommunications service provider.

In step 204, the processing system may match the domain name assigned to the second user endpoint device to a static public Internet Protocol address (e.g. an IPv4 address) that routes to a mobile terminating proxy. In one example, the mobile telecommunications service provider may provide a mobile terminating proxy which advertises the public IP addresses assigned to a plurality of user endpoint devices that subscribe to mobility services provided by mobile telecommunications service provider.

In step 206, the processing system may return, in response to the request, to the first user endpoint device a static public Internet Protocol address (e.g., an IPv4 address) that routes to a mobile terminating proxy. The mobile terminating proxy may reside in a core network of the mobile telecommunications service provider.

The method 200 may end in step 208.

Thus, the method 200 may route a mobile terminating connection from a user endpoint device which is external to a mobile telecommunications service provider network (e.g., the "first user endpoint device" described above) to a mobile terminating proxy rather than to the mobile user endpoint device that is the destination of the mobile terminating connection (e.g., the "second user endpoint device described above. Thus, in effect, the mobile terminating proxy becomes the destination of the mobile terminating connection. The mobile terminating proxy may then facilitate secure communications between the two user endpoint devices. One example of a method for facilitating secure communications between two user endpoint devices by a mobile terminating proxy is described in greater detail in connection with FIG. 3.

It should be noted that although the method 200 describes the use of domain names to identify user endpoint devices, where the domain names resolve to IP addresses which route to the mobile terminating proxy, the mobile terminating connections could be routed to the mobile terminating proxy directly, without using domain names. For instance, in another example, a static public IP address may be assigned to the mobile terminating proxy rather than to the user endpoint devices, eliminating the need for a DNS lookup. In other words, if the first user endpoint device has the public IP address assigned to the mobile terminating proxy, the first user endpoint device may send the request to establish the mobile terminating connection to the second user endpoint device directly to the mobile terminating proxy, skipping the method 200.

Figure 3:
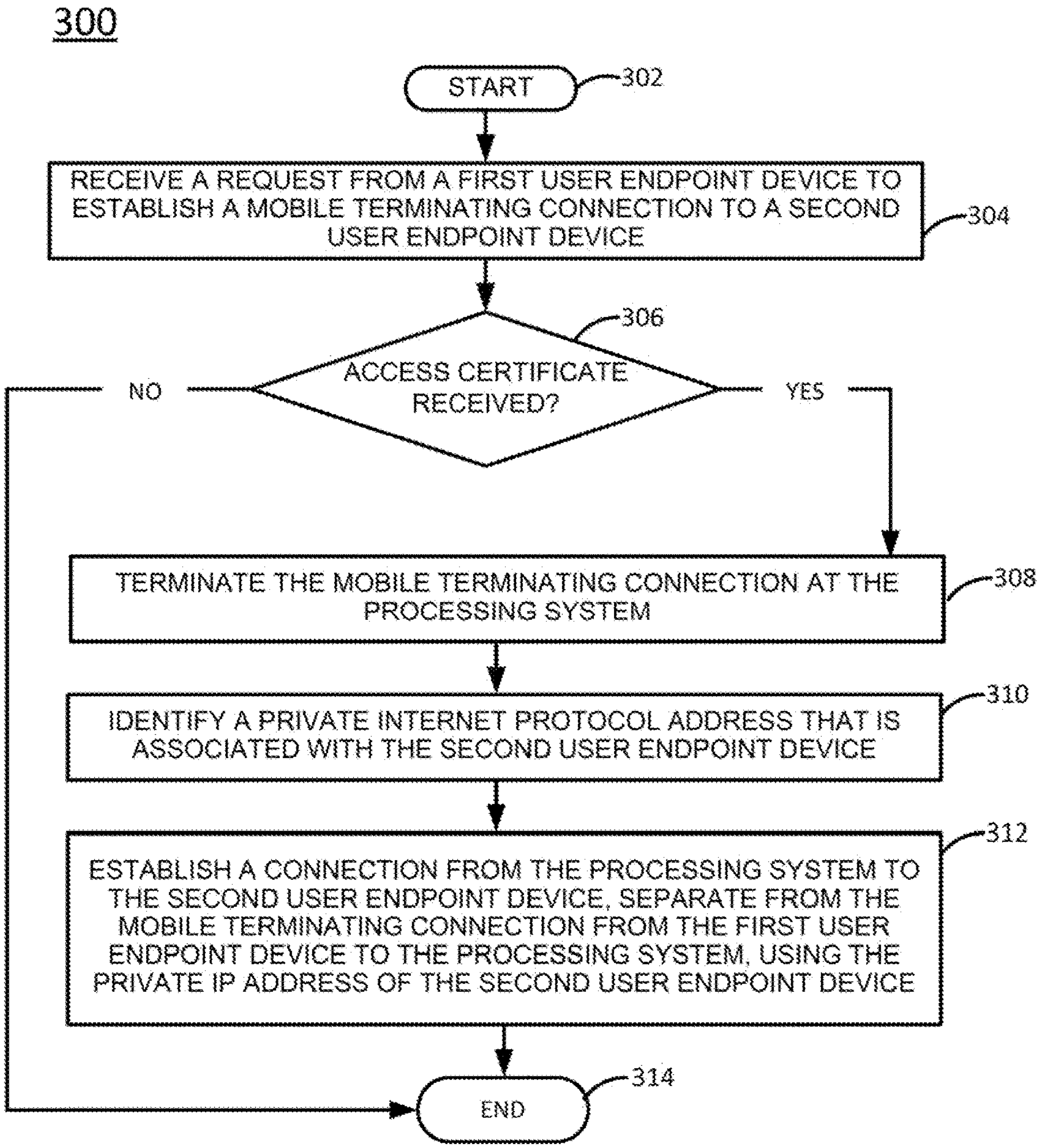
FIG. 3 illustrates a flowchart of an example method for providing secure mobile terminating connections via a transport layer approach, according to the present disclosure.

FIG. 3 illustrates a flowchart of an example method 300 for providing secure mobile terminating connections via a transport layer approach, according to the present disclosure. In one example, the steps, operations, or functions of the method 300 may be performed by any one or more of the components of the system 100 depicted in FIG. 1. For example, in one embodiment, the method 300 is performed by a mobile terminating proxy (e.g., MT proxy 106 of FIG. 1). In another example, the method 300 is performed by a mobile terminating proxy in coordination with one or more other components of the system 100, such as DNS server and/or an API service. In one example, the steps, functions, or operations of method 300 may be performed by a computing device or processing system, such as computing system 400 and/or a hardware processor element 402 as described in connection with FIG. 4 below. For instance, the computing system 400 may represent at least a portion of a mobile terminating proxy in accordance with the present disclosure. In one example, the steps, functions, or operations of method 300 may be performed by a processing system comprising a plurality of such computing devices as represented by the computing system 400. For illustrative purposes, the method 300 is described in greater detail below in connection with an example performed by a processing system.

The method 300 begins in step 302 and proceeds to step 304. In step 304, the processing system may receive a request from a first user endpoint device to establish a mobile terminating connection to a second user endpoint device. In one example, the processing system may be part of a mobile packet core network provided by a mobile telecommunications service provider, and the second user endpoint device may comprise a mobile user endpoint device that subscribes to mobility services provided by mobile telecommunications service provider. The first user endpoint device may comprise a user endpoint device that does not subscribe to mobility services provided by mobile telecommunications service provider (e.g., an external client). For instance, the first user endpoint device may comprise a mobile or non-mobile user endpoint device that subscribes to services provided by a different telecommunications service provider.

In step 306, the processing system may determine whether an access certificate that is associated with the second user endpoint device has been received from the first user endpoint device. In one example, the access certificate is a credential that is specific to the second user endpoint device (or to a group of user endpoint devices including the second user endpoint device).

The access certificate may function in a manner that is similar to a conventional access control list. For instance, the ability of the first user endpoint device to provide the access certificate associated with the second user endpoint device may serve as evidence that the first user endpoint device is authorized to establish a mobile terminating connection to the second user endpoint device. However, unlike a conventional access control list, which requires updating when user endpoint device IP addresses change, the access certificate remains valid even when the IP address of the device presenting the access certificate may have changed. Thus, once the first user endpoint device has obtained the access certificate associated with the second user endpoint device, the first user endpoint device will be able to continue establishing mobile terminating connections to the second user endpoint device even if the first user endpoint device's IP address changes over time.

In one example, a mobile telecommunications service provider may provide access certificates to the mobile telecommunications service provider's subscribers. Thus, the second user endpoint device may obtain an access certificate from the mobile telecommunications service provider providing mobility services to the second user endpoint device. The customer associated with the second user endpoint device may then select the other user endpoint devices with which the access certificate is shared. For instance, the customer associated with the second user endpoint device may choose to share the access certificate with a select number of user endpoint devices associated with individuals who are known to the customer and who the customer authorizes to establish mobile terminating connections to the second user endpoint device. In one example, the customer associated with the second user endpoint device may also revoke the access certificate at any time (e.g., if the customer decides that any of the user endpoint devices with which the access certificate was previously shared should no longer be authorized to establish mobile terminating connections to the second user endpoint device).

In one example, the first user endpoint device may include the access certificate associated with the second user endpoint device in the request to establish the mobile terminating connection to the second user endpoint device. In another example, upon receiving the request to establish the mobile terminating connection to the second user endpoint device, the processing system may prompt the first user endpoint device to provide the access certificate associated with the second user endpoint device. Thus, the access certificate associated with the second user endpoint device may be checked as part of a TLS handshake, which allows application layer protocols, such as hypertext transfer protocol secure (HTTPS) built on top of TLS, to readily support examples of the present disclosure.

If the processing system determines in step 306 that the access certificate that is associated with the second user endpoint device has not been received from the first user endpoint device, then the method 300 may end in step 314. For instance, the first user endpoint device may be unable to provide any access certificate, or the first user endpoint device may provide an access certificate associated with another user endpoint device that is not the second user endpoint device. If, however, the processing system determines in step 306 that the access certificate that is associated with the second user endpoint device has been received from the first user endpoint device, then the method 300 may proceed to step 308.

In step 308, the processing system may terminate the mobile terminating connection at the processing system. Thus, the processing system in effect becomes the destination of a mobile terminating connection from the first user endpoint device to the processing system.

In step 310, the processing system may identify a private Internet Protocol address that is associated with the second user endpoint device. In one example, the request received in step 304 may include an SNI associated with the second user endpoint device. The SNI may, in turn, be mapped to a private IP address that is assigned to the second user endpoint device. For instance, since the DNS names assigned to user endpoint devices are assumed to be largely static, the database may maintain a static configuration for the mapping between the DNS names or SNIs assigned to the user endpoint devices and the associated international mobile subscriber identities (IMSIs) or the international mobile equipment identities (IMEIs) of the user endpoint devices. Thereafter, a 5G access mobility and management function (AMF) (or a 4G mobility management entity (MME)) could provide the private IP addresses that are currently assigned to the user endpoint devices based on IMSI or IMEI. In one example, the mapping may be maintained locally by the processing system (e.g., as part of the mobile terminating proxy). However, in another example, the mapping may be maintained by a separate database that is accessible to the processing system.

In step 312, the processing system may establish a connection from the processing system to the second user endpoint device, separate from the mobile terminating connection from the first user endpoint device to the processing system, using the private IP address of the second user endpoint device. In one example, a network firewall may be configured to allow mobile terminating connections only from the processing system (e.g., where the processing system is part of a mobile terminating proxy, and the mobile terminating proxy is the origin, or "caller," of the mobile terminating connection). Thus, when the second user endpoint device responds to a mobile terminating connection from the processing system, the traffic from the second user endpoint device takes a reverse path to the first user endpoint device, via the processing system.

The method 300 may end in step 314.

Thus, the method 300, or the method 300 in combination with the method 200, provides a transport layer, proxy-based approach to establishing secure mobile terminating connections. Like conventional ACL-based approaches, the examples disclosed herein enable mobile terminating connections to mobile user endpoint devices through the use of persistent identifiers for the mobile user endpoint devices. Also like conventional ACL-based approaches, the examples disclosed herein work with secure transport protocols like TLS, QUIC, and DTLS.

However, unlike conventional ACL-based approaches, examples of the present disclosure may block insecure transport protocols like insecure transport control protocol (TCP). Also unlike conventional ACL-based approaches, the examples disclosed herein avoid or minimize reliance on public IP addresses, which allows secure mobile terminating connections to be reliably established even when the public IP address of either party changes. Examples of the present disclosure use private IP addresses, which can be updated by the telecommunications service provider network at any time, to establish connections between the mobile terminating proxy and the mobile user endpoint device.

Additionally, examples of the present disclosure avoid the need for ongoing manual updates to ACLs based on changes to external user endpoint devices. For instance, examples of the present disclosure enable one-time provisioning of a mobile user endpoint device by publishing the domain name and the access certificate of the mobile user endpoint device. Filtering using access certificates is also more accurate. While ACLs may be inaccurate (e.g., so broad as to allow all Internet traffic) or out of date (e.g., failing to account for recent changes in user endpoint device IP addresses), the access certificates disclosed herein allow the mobile terminating proxy to reliably determine whether a specific user endpoint device is authorized to initiate a mobile terminating connection to a mobile user endpoint device. The access certificate is unaffected by changes in IP addresses.

It will be appreciated that although examples of the present disclosure provide a proxy through which mobile terminating communications may flow, mobile originating connections do not need to flow through the proxy.

In addition, although not expressly specified above, one or more steps of the method 200 or the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

Figure 4:
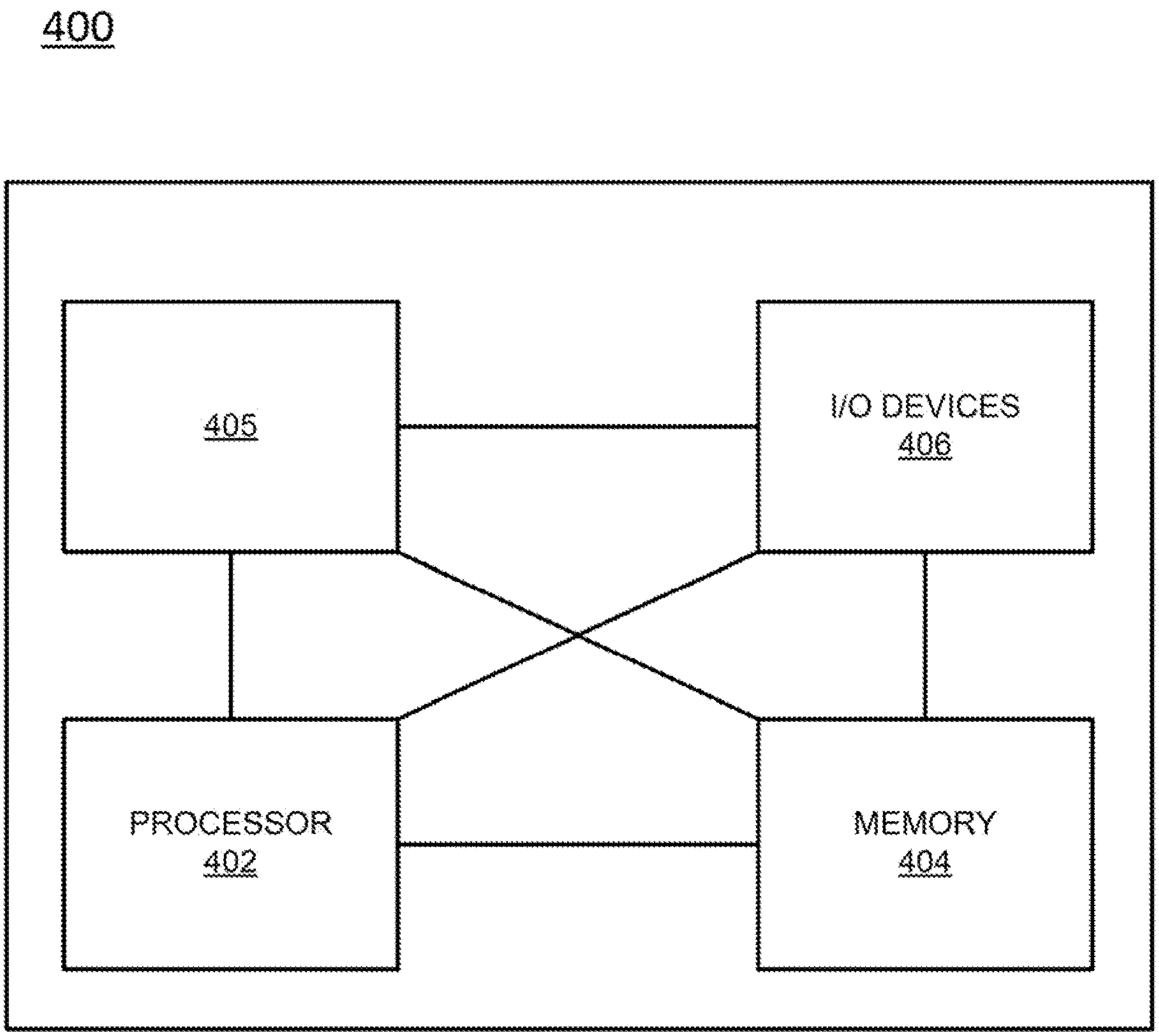
FIG. 4 illustrates a high-level block diagram of a computing device specially configured to perform the functions, methods, operations, and algorithms described herein.

FIG. 4 depicts a high-level block diagram of a computing system 400 (e.g., a computing device, or processing system) specifically programmed to perform the functions described herein. For example, any one or more components or devices illustrated in FIG. 1, or described in connection with the method 200 of FIG. 2 or the method 300 of FIG. 3, may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where hardware processor element may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for providing secure mobile terminating connections via a transport layer approach, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that, although only one hardware processor element 402 is shown, the computing device may employ a plurality of hardware processor elements. Furthermore, although only one computing device is shown in FIG. 4, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 4 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for providing secure mobile terminating connections via a transport layer approach (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing secure mobile terminating connections via a transport layer approach (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

receiving, by a processing system including at least one processor residing in a mobile packet core of a mobile telecommunications service provider network, a request from a first mobile device to establish a first mobile terminating connection to a second mobile device, wherein the second mobile device is a subscriber to a service of the mobile telecommunications service provider network, and the first mobile device is not a subscriber to the service of the mobile telecommunications service provider network;

determining, by the processing system, whether an access certificate that is associated with the second mobile device has been received from the first mobile device, wherein the access certificate is a credential that is specific to the second mobile device and is provided to the second mobile device by the mobile telecommunications service provider network, and wherein the second mobile device distributes the access certificate to the first mobile device to serve as evidence that the first mobile device is authorized to initiate the first mobile terminating connection to the second mobile device;

terminating, by the processing system, the first mobile terminating connection at the processing system when the access certificate that is associated with the second mobile device is determined to be received from the first mobile device, wherein the terminating creates the first mobile terminating connection from the first mobile device to the processing system;

identifying, by the processing system, a private internet protocol address that is associated with the second mobile device when the access certificate that is associated with the second mobile device is determined to be received from the first mobile device; and establishing, by the processing system, a second mobile terminating connection from the processing system to the second mobile device, using the private internet protocol address of the second mobile device, wherein communications between the first mobile device and the second mobile device are exchanged subsequent to the establishing via a combination of the first mobile terminating connection and the second mobile terminating connection, with the processing system serving as an intermediary for forwarding packets of the communications between the first mobile device and the second mobile device.

2. The method of claim 1, wherein a validity of the access certificate is unaffected by a change in an internet protocol address of the first mobile device.

3. The method of claim 1, wherein the access certificate is included in the request received from the first mobile device.

4. The method of claim 1, wherein the access certificate is received in response to a prompt by the processing system for the first mobile device to provide the access certificate.

5. The method of claim 1, wherein the determining is performed as part of a transport layer security handshake.

6. The method of claim 1, wherein the processing system is part of a transport layer mobile terminating proxy of the mobile telecommunications service provider network.

7. The method of claim 1, wherein the first mobile terminating connection cannot be initiated by the first mobile device without the access certificate.

8. The method of claim 1, wherein the processing system obtains the private internet protocol address from an external database.

9. The method of claim 1, wherein the private internet protocol address is mapped to a server name identification comprising a host part of a domain name that is assigned to the second mobile device, and wherein the domain name is included in the request received from the first mobile device.

10. The method of claim 9, wherein the domain name that is assigned to the second mobile device is mapped by a wild card record to a public internet protocol address assigned to the processing system, so that the request is routed to the processing system from a domain name system server of the mobile telecommunications service provider network.

11. The method of claim 10, wherein the wild card record maps a plurality of domain names assigned to a plurality of mobile devices, including the domain name that is assigned to the second mobile device, to the public internet protocol address assigned to the processing system.

12. The method of claim 10, wherein the public internet protocol address is provided to the first mobile device by a domain name system server in response to the first mobile device providing the domain name that is assigned to the second mobile device to the domain name system server.

13. The method of claim 1, wherein the access certificate remains valid when an internet protocol address of the second mobile device changes.

14. The method of claim 1, wherein a firewall is configured to allow only mobile terminating connections originating from the processing system to terminate at the second mobile device.

15. A non-transitory computer-readable medium storing instructions which, when executed by a processing system including at least one processor residing in a mobile packet core of a mobile telecommunications service provider network, cause the processing system to perform operations, the operations comprising:

receiving a request from a first mobile device to establish a first mobile terminating connection to a second mobile device, wherein the second mobile device is a subscriber to a service of the mobile telecommunications service provider network, and the first mobile device is not a subscriber to the service of the mobile telecommunications service provider network;

determining whether an access certificate that is associated with the second mobile device has been received from the first mobile device, wherein the access certificate is a credential that is specific to the second mobile device and is provided to the second mobile device by the mobile telecommunications service provider network, and wherein the second mobile device distributes the access certificate to the first mobile device to serve as evidence that the first mobile device is authorized to initiate the first mobile terminating connection to the second mobile device;

terminating the first mobile terminating connection at the processing system when the access certificate that is associated with the second mobile device is determined to be received from the first mobile device, wherein the terminating creates the first mobile terminating connection from the first mobile device to the processing system;

identifying a private internet protocol address that is associated with the second mobile device when the access certificate that is associated with the second mobile device is determined to be received from the first mobile device; and establishing a second mobile terminating connection from the processing system to the second mobile device, using the private internet protocol address of the second mobile device, wherein communications between the first mobile device and the second mobile device are exchanged subsequent to the establishing via a combination of the first mobile terminating connection and the second mobile terminating connection, with the processing system serving as an intermediary for forwarding packets of the communications between the first mobile device and the second mobile device.

16. The non-transitory computer-readable medium of claim 15, wherein a validity of the access certificate is unaffected by a change in an internet protocol address of the first mobile device.

17. The non-transitory computer-readable medium of claim 15, wherein the access certificate is included in the request received from the first mobile device.

18. The non-transitory computer-readable medium of claim 15, wherein the access certificate is received in response to a prompt by the processing system for the first mobile device to provide the access certificate.

19. The non-transitory computer-readable medium of claim 15, wherein the determining is performed as part of a transport layer security handshake.

20. An apparatus comprising:

a processing system including at least one processor residing in a mobile packet core of a mobile telecommunications service provider network; and a computer-readable medium storing instructions which, when executed by the processing system, cause the processing system to perform operations, the operations comprising:

receiving a request from a first mobile device to establish a first mobile terminating connection to a second mobile device, wherein the second mobile device is a subscriber to a service of the mobile telecommunications service provider network, and the first mobile device is not a subscriber to the service of the mobile telecommunications service provider network;

determining whether an access certificate that is associated with the second mobile device has been received from the first mobile device, wherein the access certificate is a credential that is specific to the second mobile device and is provided to the second mobile device by the mobile telecommunications service provider network, and wherein the second mobile device distributes the access certificate to the first mobile device to serve as evidence that the first mobile device is authorized to initiate the first mobile terminating connection to the second mobile device;

terminating the first mobile terminating connection at the processing system when the access certificate that is associated with the second mobile device is determined to be received from the first mobile device, wherein the terminating creates the first mobile terminating connection from the first mobile device to the processing system;

identifying a private internet protocol address that is associated with the second mobile device when the access certificate that is associated with the second mobile device is determined to be received from the first mobile device; and establishing a second mobile terminating connection from the processing system to the second mobile device, using the private internet protocol address of the second mobile device, wherein communications between the first mobile device and the second mobile device are exchanged subsequent to the establishing via a combination of the first mobile terminating connection and the second mobile terminating connection, with the processing system serving as an intermediary for forwarding packets of the communications between the first mobile device and the second mobile device.

* * * * *